United States Patent [19]

Park et al.

[11] Patent Number: 5,392,348
[45] Date of Patent: Feb. 21, 1995

[54] DTMF DETECTION HAVING SAMPLE RATE DECIMATION AND ADAPTIVE TONE DETECTION

[75] Inventors: Sangil Park; Dion M. Funderburk, both of Austin, Tex.

[73] Assignee: Motorola, Inc., Schaumburg, Ill.

[21] Appl. No.: 797,563

[22] Filed: Nov. 25, 1991

[51] Int. Cl.[6] .............................................. H04M 1/50
[52] U.S. Cl. .................................... 379/386; 379/283; 379/282; 370/110.3
[58] Field of Search ............... 379/386, 283, 282, 351; 370/110.3

[56] References Cited

U.S. PATENT DOCUMENTS

| | | | |
|---|---|---|---|
| 3,571,522 | 3/1971 | Cox | 370/110.3 |
| 4,999,830 | 3/1991 | Agazzi | 379/406 X |
| 5,144,626 | 9/1992 | Funatsu et al. | 370/110.3 |
| 5,214,693 | 5/1993 | Chujo | 379/386 |

OTHER PUBLICATIONS

"AN-1 Dual-Tone Multifrequency Receiver Using The Digital Signal Processor" published by Western Electric in Jul., 1981, pp. 1-13.
"Dual-Tone Multifrequency Receiver Using the WE DSP32 Digital Signal Processor" published by AT&T in 1988, pp. 1-15.
"Efficient DSP Based Detection of DTMF Tones" written by R. A. Valenzuela and published in the IEEE Global Telecommunications Conference & Exhibition proceedings, pp. 1717-1721.
"On The Detection and Tracking of A Class of Narrowband Sources" by N. Ahmed, D. Hush, S. Park G. R. Elliott, and R. J. Fogler and published in the Proc. of Amer. Control Conf. of 1984, pp. 210-212.

Primary Examiner—James L. Dwyer
Assistant Examiner—Paul Fournier
Attorney, Agent, or Firm—Elizabeth A. Apperley

[57] ABSTRACT

A method of dual-tone multifrequency (DTMF) detection which decimates and adaptively filters an input signal is provided to efficiently detect a presence of a DTMF signal. The input signal is provided to a halfband filter (14) to be decimated in frequency in accordance with Nyquist's theory. A decimated input signal is subsequently processed to form a low frequency component signal and a high frequency component signal. The low frequency component signal is again decimated by a decimator (24). The decimated low frequency component signal and the high frequency component signal are each filtered by an adaptive fir filter (22, 26) to provide a first and a second frequency parameter and a first and a second gain factor, respectively. The first and second frequency parameters and the first and second gain factors are then tested by a tone identifier (28) to determine if the input signal includes a valid DTMF signal.

16 Claims, 3 Drawing Sheets

5,392,348

DTMF DETECTION HAVING SAMPLE RATE DECIMATION AND ADAPTIVE TONE DETECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to communication systems, and more particularly to a method of dual-tone multifrequency detection in a communication system.

BACKGROUND OF THE INVENTION

Dual-tone multifrequency (DTMF) signalling is an industry standard format for communication of a specified digit or character from a transmitter to a receiver. Typically, DTMF signalling is used in telephone networks to place a telephone call or to initiate a predetermined function such as call forwarding, conference calling, or call transferring. Additionally, DTMF signalling is generally used in communication systems which require responses from a user of the system. For example, an automated banking transaction might require that a user provide an identification number and select one of a predetermined number of banking functions. Similarly, credit card orders of consumer goods and information systems also generally require a user interface which uses DTMF signalling.

To function correctly in a communication system, DTMF signalling assigns a predetermined set of two tones to each number or character of a telephone keypad. The set of two tones includes both a low tone which ranges from 600 Hz to 1000 Hz and a high tone which ranges from 1200 Hz to 1700 Hz. DTMF signalling uses four predetermined low tones and four predetermined high tones to encode a total of sixteen possible digits or characters. During transmission, a DTMF transmitter combines the low and the high tones to provide a single transmission signal to a DTMF receiver.

To correctly detect one of the sixteen digits or characters, the DTMF receiver must detect and decode the transmission signal provided by the DTMF transmitter. Correct detection of a signal or character encoded using the DTMF signalling method requires both a valid pair of tones and a correct timing procedure. The correct timing procedure requires that the transmission signal must provide a digit or a character for a minimum of forty milliseconds and a maximum of sixty milliseconds. Additionally, the transmission signal is also required to have a dead time of at least fifty milliseconds before another digit or character is received. If a signal provided to the DTMF receiver does not meet the requirements specified by the timing procedure, a valid tone is not received.

DTMF receivers are also required to detect valid frequencies between plus or minus 1.5% of a respective frequency of each one of the pair of valid tones. Tones which vary by plus or minus 3.5% must be rejected as invalid. By rejecting such tones, DTMF receivers do not falsely detect speech or other transferred signals as valid tones which represent one of the plurality of predetermined DTMF values. Additionally, DTMF receivers must be able to detect a tone with a worst case signal to noise ratio of 15 dB and an attenuation of 26 dB. When a high tone and a low frequency tone are received at different strengths, DTMF receivers must be able to compensate for the strength difference, which is also referred to as "twist." When the high frequency tone is received at a lower strength level than the low frequency tone, normal twist occurs. Conversely, when the low frequency tone is received at a lower strength level than the high frequency tone, reverse twist occurs. DTMF receivers must compensate for a maximum of 8 dB of normal twist and 4 dB of reverse twist.

Although originally developed as analog circuits, some DTMF receivers are currently implemented using a digital signal processor having a DTMF decode circuit. For example, in a first digital implementation, a DTMF decoder is formed using a plurality of tuned filters to receive and decode an input signal provided by a DTMF transmitter. The plurality of tuned filters are typically implemented as bandpass infinite impulse response (IIR) filters. The encoded input signal is appropriately scaled and then band-pass filtered to provide a high frequency signal and a low frequency signal. The high and low frequency signals are respectively provided to a first and a second plurality of resonators.

Each of the first and second plurality of resonators is tuned to a predetermined one of the eight frequencies (four high frequency tones and four low frequency tones) used in DTMF encoding. For example, a fourth one of the first plurality of resonators is tuned to a high frequency tone of 1633 Hz. Similarly, a first one of the second plurality of resonators is tuned to a low frequency tone of 697 Hz. If the high frequency input signal includes one of the four high frequency tones used in DTMF encoding, a respective one of the first plurality of resonators corresponding to the input tone provides a high tone output signal indicating that a valid high frequency tone is present. If the high frequency input signal does not include one of the four high frequency tones used in DTMF encoding, the first plurality of resonators does not provide the output signal. Similarly, if the low frequency input signal includes one of the four low frequency tones used in DTMF encoding, a respective one of the second plurality of resonators corresponding to the input tone provides a low tone output signal indicating that a valid low frequency tone is present. Additionally, if the low frequency input signal does not include one of the low frequency tones used in DTMF encoding, the second plurality of resonators does not provide the output signal. If valid, the high and low tone output signals provided by the first and the second plurality of resonators are subsequently processed and manipulated by a digital signal processor to determine if all specifications of DTMF encoding and reception are fulfilled. Although the tuned resonator approach described above provides a digital solution to decoding DTMF encoded frequencies, at least eight resonator circuits and corresponding detector circuits are required. Additionally, the tuned resonator approach requires a significant amount of processing time to decode and test a DTMF encoded signal. For more information on a matched filter implementation of a DTMF receiver, refer to a Western Electric application note entitled "AN-1 Dual Tone Multifrequency Receiver Using the Digital Signal Processor" written by E. S. Chatlos, Jr., in July, 1981.

A second known digital implementation of a DTMF receiver uses a Goertzel algorithm to decode a DTMF encoded signal. The second implementation uses the Goertzel algorithm to calculate a single coefficient of a predetermined discrete Fourier transform (DFT). Additionally, the second implementation may use the Goertzel algorithm in a recursive manner to save processing time typically needed to decode a DTMF encoded signal. A circuit for implementing the Goertzel algorithm is described in more detail in an application note published by AT&T entitled "Dual-Tone Multifrequency Receiver Using the WE DSP32 Digital Signal Processor." The authors, J. Hartung, S. L. Gay, and G. L. Smith, published the application note in June, 1988. Although the Goertzel algorithm may decode a DTMF encoded signal more quickly than the first implementation described above, at least eight filters are again required. Therefore, the amount of DTMF decoder circuitry used to implement the Goertzel algorithm is not reduced.

The first and second implementations of DTMF receivers described herein are typically used in digital receiver systems to receive and subsequently decode DTMF encoded signals for further use. In either implementation, however, a substantial amount of circuitry is needed to detect a frequency of the encoded input signal. Additionally, an excessive amount of processing time is typically necessary to execute the decode operation of the input signal in the implementations of the DTMF receivers described above.

The time necessary to execute the decode operation of the input signal in the implementations of the DTMF receivers described above is further lengthened by limitations of digital signal processors. During DTMF decoding, a digital signal processor (DSP) may perform a number of functions by multiplexing a plurality of input channels at different times. However, the number of input channels which may be processed by the DSP is limited by the frequency at which the input channels are transmitted. In one software based implementation, a greater number of input channels may be decoded and processed more efficiently if the encoded signal is processed at a lowest possible sampling rate. By lowering the sampling rate, the DSP does not have to perform each of the processing steps as quickly as would be required if the sampling rate was higher. Therefore, the DSP is free to further multiplex functions such that a greater number of input channels may be decoded and processed in a more efficient manner. Still, however, a plurality of filters is required to compute coefficients of a discrete Fourier transform corresponding to the input signal. The input signal is then decimated to provide a decimated composite frequency signal. To detect whether the decimated composite frequency includes one of the plurality of DTMF tones, a plurality of matched filters is provided to detect whether a predetermined one of the plurality of DTMF tones is encoded within the input signal. Although the software implementation of a DTMF decoder described above uses a DSP more efficiently, a plurality of detectors is still required to detect a valid DTMF tone in an input signal.

An example of an implementation of the DTMF decoder described above is provided in an article written by R. A. Valenzuela and entitled "Efficient DSP Based Detection of DTMF Tones." The article was presented at the IEEE Global Telecommunications Conference & Exhibition held from December 2 to December 5 in 1990 and was published in volume 3 of the corresponding proceedings. However, in the DTMF decoder described therein, only a portion of the DTMF encoded signals could be processed. Additionally, in the method described by Valenzuela, matched filters are still required to detect a presence of one of the plurality of DTMF encoded signals. Therefore, although more input channels may be processed by the DSP, a substantial amount of circuitry is required.

For each implementation of a DTMF receiver described above, at least two coefficients and two data values must be stored for each tuned filter. A substantial amount of memory is, therefore, required to store each of the required data values over a period of time determined by the frequency at which the input tone is sampled by the DTMF receiver. Additionally, for the DTMF receivers previously described, a predetermined number of input signals are required to accurately detect the presence of a DTMF tone. The performance of each of the DTMF receivers is, therefore, constrained by a predetermined amount of time required to receive and process the input signals. In each of the known implementations of DTMF receivers described herein, a DTMF tone may not be accurately detected before the predetermined amount of time has passed.

Therefore, a need exists for a DTMF receiver to efficiently detect and process an input signal using a minimum amount of both logic and memory circuitry. The input signal should be tested to ensure that all the specifications of a DTMF encoded signal are fulfilled. The DTMF receiver should also process a maximum number of input channels and continue to provide accurately decoded results.

SUMMARY OF THE INVENTION

The previously mentioned needs are fulfilled with the present invention. Accordingly, there is provided, in one form a method and circuit for performing dual-tone multifrequency detection. The method includes the step of receiving an input signal having both a first and a second frequency component. The input signal is decimated by a first predetermined integer ratio to provide a decimated signal. The decimated signal is low pass filtered to remove the first frequency component from the input signal to provide a second frequency component. The second frequency component is subtracted from the decimated signal to provide a first frequency component signal. The first frequency component signal is adaptively filtered to provide a first frequency parameter and a first gain factor derived from the first frequency component. The second frequency component signal is decimated by a second predetermined integer ratio to provide a decimated second frequency component signal. The decimated second frequency component signal is adaptively filtered to provide a second frequency parameter and a second gain factor derived from the decimated second frequency component signal. Each of the first and second frequency parameters is compared to a plurality of predetermined frequency parameters. Additionally, each of the first and second gain factors is compared to a plurality of predetermined threshold values to determine dual-tone validity.

These and other features, and advantages, will be more clearly understood from the following detailed description taken in conjunction with the accompanying drawing.

DETAILED DESCRIPTION OF A PREFERRED EMBODIMENT

The present invention provides a method for dual-tone multifrequency (DTMF) detection in a communication system. The method of DTMF detection described herein quickly and efficiently receives and detects a presence of a DTMF encoded digit or character in an input signal. To efficiently detect and process a maximum number of input channels, each input signal is decimated to a lower frequency which is in accordance with Nyquist's theory. By lowering the frequency of each of input signal, more channels may be processed with less computational complexity typically associated with signals provided at higher frequencies. Additionally, a high tone and a low tone, generally associated with DTMF encoding, are detected using only two adaptive infinite impulse response (IIR) filters. Therefore, a minimal amount of circuitry is required to implement the method for DTMF detection described in accordance with the present invention. Additionally, the method of DTMF detection described herein performs accurate DTMF detection with a minimal number of input signals. Therefore, detection of a DTMF encoded signal is accomplished in a minimal amount of time.

DTMF encoding assigns a predetermined set of two tones to a digit or character. The two tones are a high frequency tone and a low frequency tone which are not harmonically related. Table 1 illustrates the possible DTMF frequency combinations.

TABLE 1

| Frequency (Hz) | 1209 | 1336 | 1477 | 1633 |
| --- | --- | --- | --- | --- |
| 697 | 1 | 2 | 3 | A |
| 770 | 4 | 5 | 6 | B |
| 852 | 7 | 8 | 9 | C |
| 941 | * | 0 | # | D |

Correct detection of a signal or character encoded using the DTMF signalling method requires more than a valid pair of tones. A correct timing procedure and several other DTMF encoding specifications must also be fulfilled. Both the timing requirements and the other DTMF encoding specifications were previously discussed in detail. Table 2 is provided to summarize both the timing and encoding specifications required for DTMF signalling.

TABLE 2

| Tone On | 40 ms to 60 ms |
| --- | --- |
| Tone Off | 50 ms (min) |
| Normal Twist | 8dB |
| Reverse Twist | 4dB |
| Valid Tone accept | ±1.5% |
| Invalid Tone reject | ±3.5% |
| Attenuation | 26dB |
| Signal to Noise Ratio | 15 dB |

Figure 1:
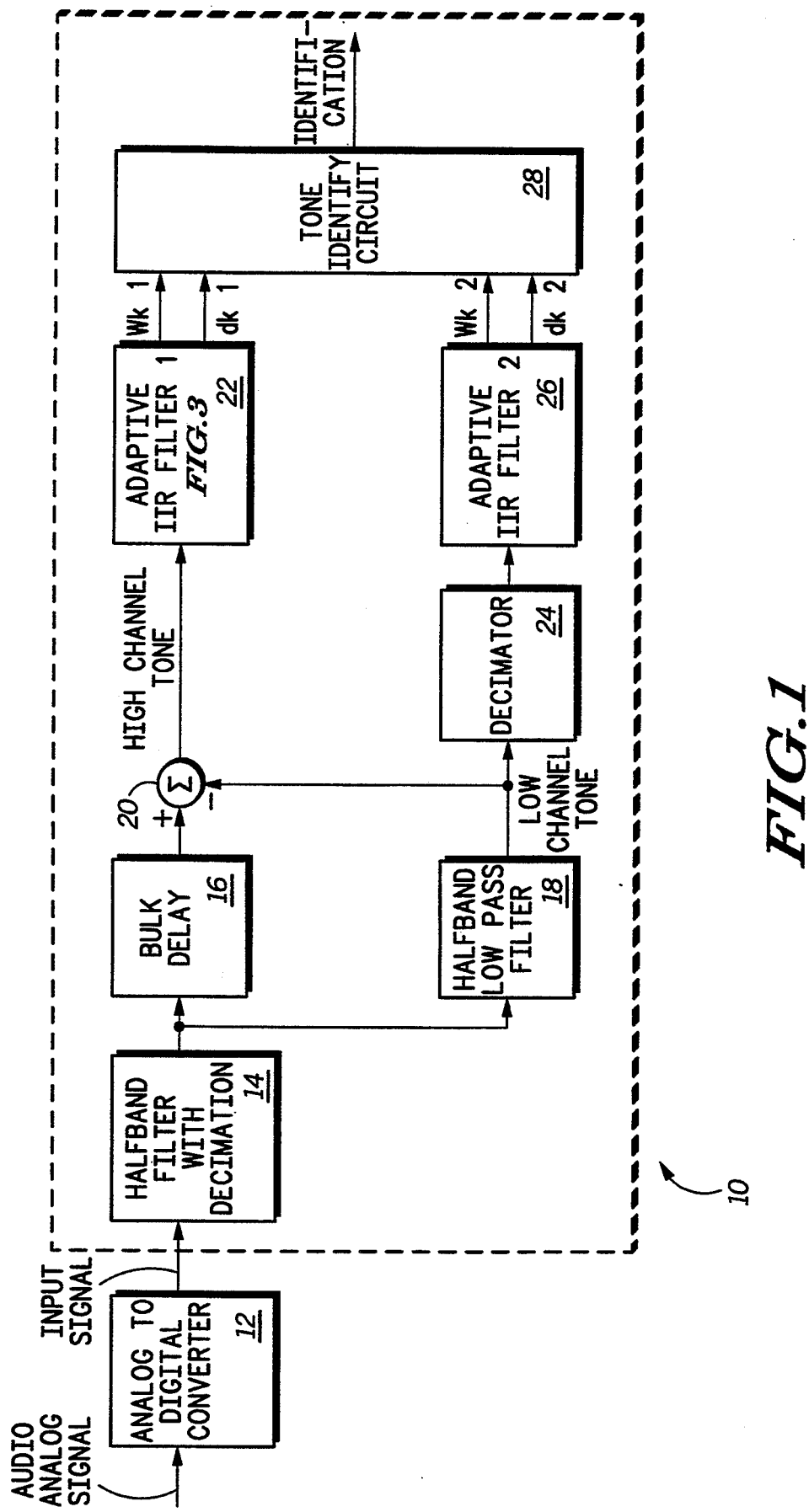
FIG. 1 illustrates in block diagram form a communication system for implementing dual-tone multifrequency detection in accordance with the present invention.

A communication system 10 for implementing a method of DTMF detection in accordance with the present invention is illustrated in FIG. 1. Communication system 10 generally includes an analog to digital (A–D) converter 12, a half-band filter with decimation 14, a bulk delay circuit 16, a half-band low pass filter 18, an adder 20, a first adaptive IIR filter 22, a decimator 24, a second adaptive IIR filter 26, and a tone identify circuit 28.

An external user of communication system 10 provides an analog signal labelled "Audio" to an input of A–D converter 12. A/D converter 12 may be implemented as any analog to digital converter, including a sigma-delta analog to digital converter. An output of A–D converter 12 is connected to half-band filter with decimation 14 to provide a digital signal labelled "Input." An output of half-band filter with decimation 14 is connected to both an input of bulk delay circuit 16 and half-band low pass filter 18. In this embodiment of the invention, half-band low pass filter 18 may be implemented as either a half-band finite impulse response filter or as a half-band infinite impulse response filter. An output of bulk delay 16 is connected to an add input of adder 20. An output of half-band low pass filter 18 is connected to both a subtract input of adder 20 and an input of decimator 24 to provide a signal labelled "Low Channel Tone." An output of adder 20 is connected to adaptive IIR filter 22 to provide a signal labelled "High Channel Tone." Concurrently, an output of decimator 24 is connected to adaptive IIR filter 26. A first output and a second output of adaptive IIR filter 22 are connected to tone identify circuit 28 to respectively provide a signal labelled "Wk1" and a signal labelled "dk1." Similarly, a first output and a second output of adaptive IIR filter 26 are connected to tone identify circuit 28 to respectively provide a signal labelled "Wk2" and a signal labelled "dk2." Tone identify circuit 28 subsequently provides a signal labelled "Identification" to either the external user or another portion (not shown) of communication system 10.

Figure 2:
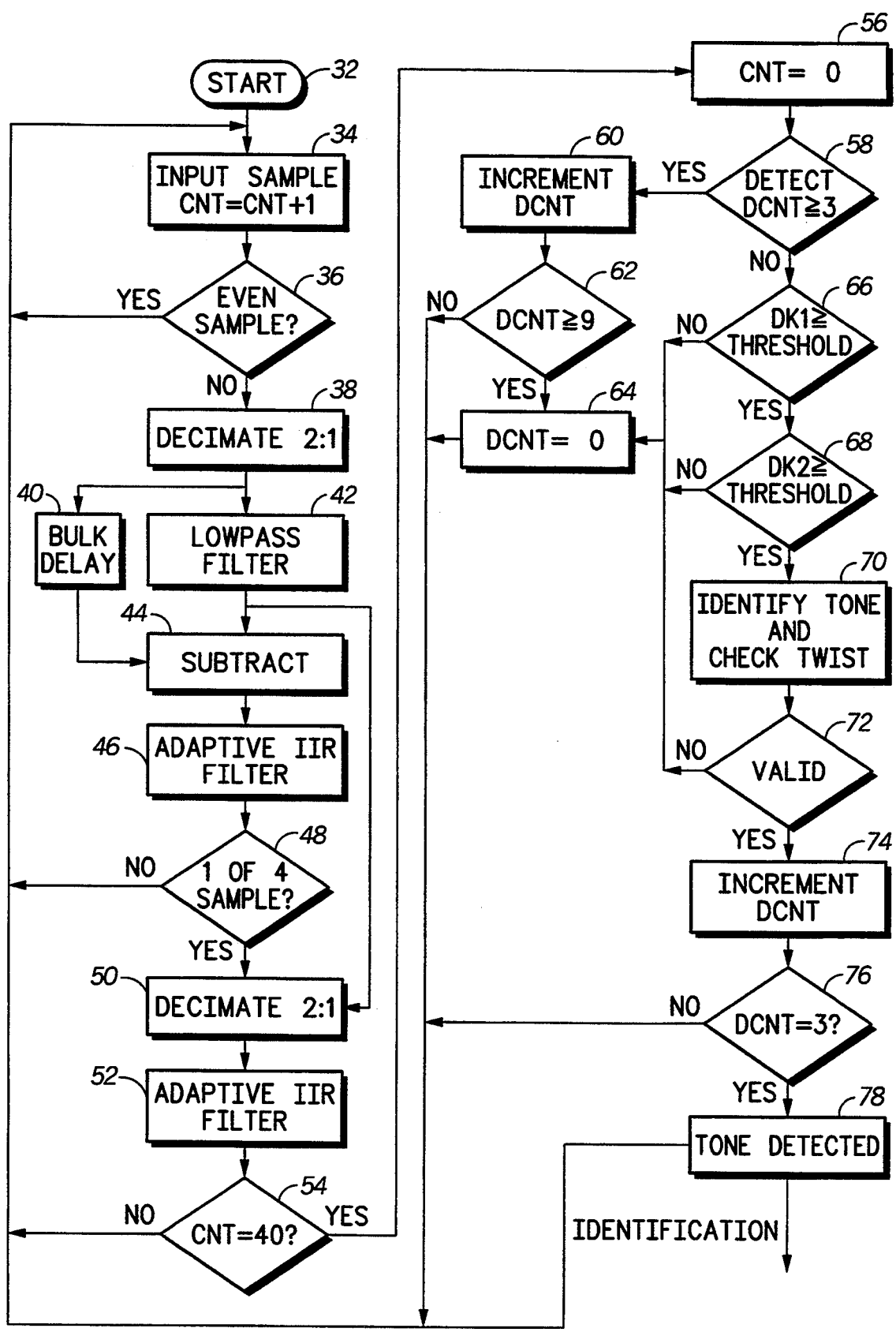
FIG. 2 illustrates in flow chart form the method of dual-tone multifrequency detection of the system of FIG. 1 in accordance with the present invention.

During operation, the function performed by each component of communication system 10 following A–D converter 12 is typically implemented as a software program which controls a digital signal processor (DSP). In FIG. 2, a flow chart illustrates a possible implementation of a software program for performing DTMF detection in a DSP in accordance with the present invention.

In FIG. 2, a step 32 labelled "Start" indicates when A–D converter 12 provides the Input signal to half-band filter with decimation 14. The Input signal is sampled at an industry standard telecommunications sampling rate of 8 kilohertz. Additionally, a value labelled "CNT" is initialized during step 32. The CNT value indicates a number of iterations of a first portion of the software program which have been executed. Each iteration requires a predetermined amount of time dependent on a digital signal processor in which the DTMF detection is performed. Therefore, by counting the number of iterations of the first portion of the software program, an amount of time the Input signal is provided to half-band filter with decimation 14 may be calculated. The amount of time the Input signal is present is required to determine if the Input signal is a valid DTMF encoded signal. As was previously discussed, the Input signal must be present for at least forty milliseconds and not longer than sixty milliseconds as determined by standard DTMF specifications.

In step 34, the CNT value is incremented by one. To ease processing complexity required by a decimation process performed in subsequent steps, the Input signal is then tested in step 36 to determine if it is an even or an odd sample. If the Input signal is an even sample, the Input signal is temporarily latched in half-band filter with decimation 14. Subsequently, a next Input signal is provided and the CNT value is incremented by one. The next Input signal is tested in step 36 to determine if it is an even or an odd sample. If the next Input signal is an odd sample, half-band filter with decimation 14 filters the odd sample of the next Input signal and the even sample of the Input signal to provide a decimated Input signal. According to Nyquist's theory, since all DTMF encoded tones are less than 2 kilolhertz, the Input signal may be sampled, or decimated, to 4 kilohertz without losing information transferred in the Input signal. Therefore, in step 38, the sampling frequency of the Input signal is decimated to 4 kilohertz, and a decimated Input signal is provided to both bulk delay circuit 16 in step 40 and half-band low pass filter 18 in step 42. Half-band filter 14 may be implemented using a software routine in a digital signal processor.

During step 42, half-band low pass filter 18 filters a high frequency component from the decimated Input signal to provide the Low Channel Tone signal. The Low Channel Tone signal provides a low frequency component of the decimated Input signal. Concurrently, during step 40, bulk delay circuit 16 temporarily stores the decimated Input signal for a predetermined amount of time. The predetermined amount of time is generally equivalent to an amount of time half-band low pass filter 18 requires to filter the decimated Input signal to provide the Low Channel Tone signal. The amount of time required to filter the decimated Input signal is generally equal to one half a number of coefficients used by half-band filter 18 to generate the Low Channel Tone signal. As with half-band filter with decimation 14, both half-band low pass filter 18 and bulk delay circuit 16 may be implemented as a software routine in a digital signal processor.

Subsequently, half-band low pass filter 18 provides the Low Channel Tone signal to both the subtract input of adder 20 and the input of decimator 24. Additionally, bulk delay circuit 16 provides the decimated Input signal to the add input of adder 20. In step 44, adder 20 subtracts the Low Channel Tone signal from the decimated Input signal to provide the High Channel Tone signal. The High Channel Tone signal provides a high frequency component of the decimated Input signal.

The High Channel Tone signal is then filtered by adaptive IIR filter 22 in step 46. Adaptive IIR filter 22 is an infinite impulse response filter which locks on to a sinusoid signal in the High Channel Tone signal and subsequently 30 provides a first frequency parameter labelled "Wk1" and a first gain factor labelled "dk1" to tone identify circuit 28.

Figure 3:
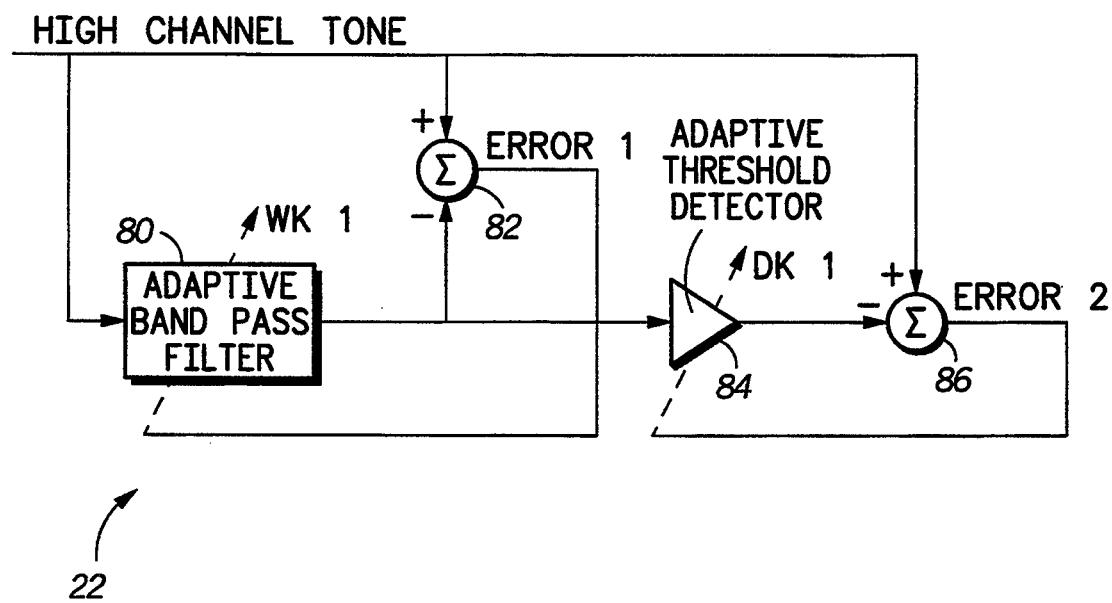
FIG. 3 illustrates in block diagram form an adaptive IIR filter of FIG. 1.

Adaptive IIR filter 22 is illustrated in more detail in FIG. 3. Adaptive IIR filter 22 generally includes an adaptive band pass filter 80, a first adder 82, an adaptive threshold detector 84, and a second adder 86. The High Channel Tone signal is provided to a first input of adaptive band pass filter 80, an add input of adder 82 and an add input of adder 86. An output of adaptive band pass filter 80 is connected to both a subtract input of adder 82 and a first input of adaptive threshold detector 84. An output of adder 82, a signal labelled "Error 1," is connected to a second input of adaptive band pass filter 80 to adjust the frequency parameter Wk1. Similarly, an output of adder 86, a signal labelled "Error 2," is connected to a second input of adaptive threshold detector 84 to adjust the gain factor dk1.

During operation, adaptive band pass filter 80 performs a bandpass filter operation with an adaptive center frequency determined by Wk1 on the High Channel Tone signal to provide an intermediate sinusoidal tone. Adder 82 subtracts the intermediate sinusoidal tone from the High Channel Tone signal to provide the Error 1 signal indicating a difference between the two signals. The Error 1 signal is then provided to the adaptive band pass filter 80 to modify the intermediate sinusoid signal such that the difference between the intermediate sinusoidal tone and the High Channel Tone signal is minimized. The corresponding sinusoidal tone is multiplied by a scaling factor in adaptive threshold detector 84 to provide the gain factor labelled dk1. When detection of a sinusoidal tone is declared by adaptive threshold detector 84, a frequency parameter is provided to tone identify circuit 28 via the Wk1 signal. For more information about adaptive IIR filters, refer to an article written be N. Ahmed, D. Hush, S. Park, G. R. Elliott, and R. J. Fogler and entitled "On the Detection and Tracking of a Class of Narrowband Sources." The article was published in the *Proceedings of American Control Conference (ACC)* held in San Diego, Calif. from June 6 to 8 in 1984. Additionally, a software program implementing adaptive IIR filter 22 in a Motorola DSP 56001 is provided in Appendix I.

During step 48, the first frequency parameter, Wk1, and the first gain factor, dk1, are tested to determine whether each is provided at a 30 predetermined fourth sample of the Input signal. If the predetermined fourth sample of the Input signal is provided, decimator 24 is enabled to decimate the Low Channel Tone signal to a lower frequency in a step 50. Again, according to Nyquist's theory, since all DTMF low frequency encoded tones are less than 1 kilohertz, the Low Channel Tone signal may be sampled, or decimated, to 2 kilohertz, without losing information in the Low Channel Tone signal. Therefore, in step 50, the Low Channel Tone signal is decimated to 2 kilohertz, and a decimated Low Channel Tone signal is provided to adaptive IIR filter 26 in step 52. By decimating the Low Channel Tone signal in step 50, the Low Channel Tone signal provides low tone frequency information to adaptive IIR filter 26 at a lower sampling rate. Therefore, adaptive IIR filter 26 is required to perform only half a number of filtering operations which would have been required without decimating the Low Channel Tone signal. Additionally, adaptive IIR filter 26 performs only a quarter of a number of filtering operations which would have been required if the Input signal was not decimated by halfband filter with decimation 14.

If a current input sample is a predetermined fourth sample of the Input signal, adaptive IIR filter 26 adaptively filters the decimated Low Channel and subsequently provides a second frequency parameter, Wk2, and a second gain factor, dk2, to tone identify circuit 28 in step 52. In the implementation of the invention described herein, adaptive IIR filter 26 is configured identically to adaptive IIR filter 22 which is illustrated in further detail in FIG. 3.

If the current input sample is not the predetermined fourth sample of the Input signal, the Input signal is again provided to half-band filter with decimation 14 and steps 32 through 48 are repeated.

Upon providing both the second frequency parameter and the second gain factor, tone identify circuit 28 tests the CNT value to determine if it is equal to forty in step 54. As previously described, the CNT value indicates a number of iterations of the first portion of the software program which have been executed. Each iteration requires a predetermined amount of time dependent on a digital signal processor in which the DTMF detection is performed. Therefore, by counting the number of iterations of the first portion of the software program, an amount of time the Input signal is provided to half-band filter with decimation 14 may be calculated. When the CNT value to equal forty, the Input signal has been present for 10 milliseconds. If the CNT value is not equal to forty, steps 32 through 62 are repeated until the CNT value is equal to forty.

If the CNT value is equal to forty, tone identify circuit 28 resets the CNT value to zero in step 56. Additionally, a DCNT value is provided by tone identify circuit 28 to indicate a number of intervals which CNT is equal to forty, or the Input signal has been provided to half-band filter with declination 14 for 10 milliseconds. Therefore, when DCNT is equal to 1, the Input signal has been provided to half-band filter with decimation 14 for 10 milliseconds. Similarly, when DCNT is equal to 2, the Input signal has been provided to half-band filter with decimation 14 for 20 ms. As indicated in the DTMF specification, the Input signal must be provided to communication system 10 for a period of time between forty and sixty milliseconds to be a valid signal. Therefore, when DCNT equals 4, the Input signal has been present for at least forty milliseconds.

During step 58, the DCNT value is tested to determine if it is greater than or equal to 3. If the DCNT value is greater than or equal to 3, the DCNT value is incremented by one in step 60. Subsequently, the DCNT value is tested to determine if it is greater than or equal to nine in step 62. If the DCNT value is not greater than or equal to nine, steps 32 through 62 are repeated. If the DCNT is greater than or equal to nine, between forty and sixty milliseconds of quiet time has passed after the detection of a valid input signal. Therefore, the DCNT value is set to zero and the process for detecting a DTMF encoded signal is again executed.

If the DCNT value is not greater than or equal to three, tone identify circuit 28 compares the first gain factor, dk1, to a first predetermined threshold value stored therein. If dk1 is greater than the first predetermined threshold value, the high Channel Tone signal is valid. If the dk1 value is not greater than or equal to the first predetermined threshold value, the DCNT value is again set to zero, and steps 32 through 66 are repeated. If the dk1 value is greater than or equal to the first predetermined threshold value, the second gain factor, dk2, is compared to a second predetermined threshold value. Again, if the dk2 value is not greater than or equal to the second predetermined threshold value, the DCNT value is set to zero as specified in step 64. The Input signal is then provided to half-band filter with decimation 14 and steps 32 through 68 are again executed.

If the dk2 value is greater than or equal to the second predetermined threshold value, tone identify circuit 28 respectively compares the first and the second frequency parameters, Wk1 and Wk2, to one of the four known high frequencies and one of the four known low frequencies used to encode a digit or character according to DTMF specifications. Additionally, in step 70, the difference of each of the gain factors is also analyzed to determine whether the twist is within the limits determined by the DTMF specifications.

If either Wk1 or Wk2 do not match one of the DTMF specified frequencies, the Input signal is determined to be invalid. DCNT is subsequently set to zero. Therefore, steps 32 through 72 are again repeated to determine a valid input signal. Additionally, if the difference of dk1 and dk2 is not within the twist requirements determined by the DTMF specifications, the DCNT value is again set to zero and steps 32 through 72 are repeated.

If Wk1 and Wk2 both match a corresponding DTMF specified tone and, dk1 and dk2 are within twist requirements, the DCNT value is incremented in step 74. The DCNT value is then tested to determine whether it is equal to 3. If not, steps 32 through 76 are repeated. The DCNT value must equal three to satisfy DTMF timing requirements previously discussed.

However, if the DCNT value is equal to three, tone identify circuit 28 provides a signal indicating that a valid input signal was received and subsequently passes information specifying both the high and the low tone to either an external user or to a remaining portion of a communications system via the Identification signal.

The method for DTMF detection in a communications system described herein quickly and efficiently receives and decodes DTMF input signals. A substantial amount of circuitry required to implement either a decoder which either performs Goertzel's algorithm or has a plurality of matched filters to detect a DTMF signal is alleviated with the method of DTMF detection described herein. By adaptively filtering both a high frequency component and a low frequency component of a DTMF encoded input signal, only two filter circuits are required. In contrast, at least eight filters are typically required for other known implementations of DTMF decoders. The method for separation of the high and low frequency components from the DTMF encoded input signal also requires a minimal amount of circuitry. Typically, several more filters must be used with the addition of another adder circuit.

Additionally, by using only two filters to perform DTMF detection in the communications system, only one-fourth of an amount of memory circuitry typically required for DTMF detection is required. Rather than having to supply memory circuitry to store eight data values, eight Fourier transform coefficients, and eight threshold values, the implementation of DTMF detection performed in communications system 10 only requires memory circuitry to store two data values, two gain values, and two threshold values.

As well, by using adaptive filters to determine a frequency value for each input, tones may be identified as valid or invalid without a plurality of notch filters typically required to remove frequencies associated with dial tones (440 Hz and lower). If the frequency value was 440 Hz or lower, it would not correspond to a valid tone in the tone identify circuit 28. Therefore, the tone would be easily be determined to be invalid without a need for additional filter circuitry.

The method for DTMF detection described herein also efficiently detects a maximum number of all DTMF encoded input signals. By decimating each of the input signals, more channels are processed than signals provided at higher frequencies. By reducing the computational complexity of DTMF detection through the use of adaptive IIR filters, the method described herein is able to significantly increase an amount of other instructions which may be processed. By increasing the amount of other instructions, operations other than tone identification and twist check may also be executed.

Additionally, in the method for DTMF detection described herein, a presence of a DTMF encoded tone in an input signal is accurately detected upon receipt of a first input signal. A minimum number of input signals is not required to accurately detect the presence of the DTMF encoded tone as is typically required in other known implementations of DTMF detectors.

The implementation of the invention described herein is provided by way of example only. However, many other implementations may exist for executing the function described herein. For example, although the method of DTMF detection described herein is implemented as a software program within a digital signal processor, a circuit may also be used to perform the DTMF detection. Additionally, the numbers used to determine when each step of the method should be executed are dependent on a medium in which the method is implemented. For example, a number used to count a time period in which a valid input signal is provided is dependent on a timing requirement of a predetermined digital signal processor. Adaptive IIR filter 22 and 26 may also be implemented using any logic circuit which performs an adaptive filtering function.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

Appendix I

Adaptive DTMF Detection Routine
Motorola DSP Operations
Authors Dion Funderburk and Sangil Park    8/16/91    Rev. 1.0
Work with Cholla EVB with 8 Khz sps set up

| Date | Description |
|---|---|
| 8/17/91 | corrected the code for $Dk+1 = Dk + u*Ek*Xk$ |
| 8/17/91 | disable Dk update routine to check the others (Dk=1 always) |
| 8/17/91 | Wk initialization has to be 0 not 0.5 |
| 8/17/91 | added limit function for Ak and Wk |
| 8/18/91 | Modify to Equation $Ak = (1-r^{}2)/(1+r^{}2)*Xk-1 + X'k-1$ |
| 8/18/91 | Removed Ak storage and removed unnecessary routines |
| 8/18/91 | Change the main equation to prevent temporary overflow $X'k = 2I(ratio*Wk/w*Xk-1-(1-r^{**}2)/2*Xk-2+Wk/2*X'k-1 - r^{**}2/2*X'k-2)$ |
| 8/19/91 | Make separate estimation and detection block |
| 8/19/91 | Make Dk adaptive and use different mu. |

```
start    equ    $40                    ;program starting point
input    equ    $ffef                  ;SSI input buffer
output   equ    $ffef                  ;SSI output buffer
m_bcr    equ    $fffe                  ;Bus Control Register
m_cra    equ    $ffec                  ;SSI Control Register A
m_crb    equ    $ffed                  ;SSI Control Register B
m_pcc    equ    $ffe1                  ;Port C Control Register
m_ipr    equ    $ffff                  ;Interrupt Priority Register
r        equ    0.91                   ;bandwidth parameter (0<<r<1)
rr       equ    r*r                    ;r**2 value
ccc      equ    -rr/2                  ;(-r**2)/2
ratio    equ    (1-rr)/(1+rr)          ;(1-r**2)/(1+r**2)
aaa      equ    2*ratio                ;2*(1-r**2)/(1+r**2)
bbb      equ    -(1.-rr)/2             ;-(1-r**2)/2
mu1      equ    .005                   ;convergence parameter for Wk
                                       ;update
mu2      equ    .105                   ;convergence parameter for Fk
                                       ;update
         org    x:$0
xin      dsm    3                      ;Xk,Xk-1, Xk-2
         org    y:$0
xout     dsm    2
misc     dsm    6
err2     ds     1
dk       ds     1
         org    p:$0
         imp    start
         org    p:$c
         jsr    Rx_ssi                 ;Receive Interrupt vector
         jsr    Rx_ssi                 ;Receiver Exception Interrupt
                                       ;vector
         org    p:start                ;program start address
         ori    #$03,mr                ;disable all interrupts
         clr    b
         movep  b,x:m_bcr              ;BCR = 0, no wait states
         movep  #$3000,x:m_ipr         ;set ssi interrupt priority
         movec  b,sp                   ;init stack pointer
         move   b,sr                   ;clear loop flag
         move   b,x:m_pcc              ;zero PCC to cycle it, reset SSI
```

-continued

Appendix I

|  |  |  |  |
|---|---|---|---|
|  | movep | #$4000,X:m_cra | ;16—bit words, 2 words/frame |
|  |  |  | ;SSI clk=osc/4/(3+1)=osc/16 |
|  | movep | #$bb00, x:m_crb | ;Rx Int enabled, RX/TX enabled, |
|  |  |  | ;network (!!), cont.clk, sync, |
|  |  |  | ;FS(bit) , MsBout 1st, int clk |
|  | movep | #$01ff, x:m_pcc | ;enable all SSI & SCI functions |
|  | move | #xin, r3 | ;Xk |
|  | move | #xout, r5 | ;X'k |
|  | move | #misc+1, r7 | ;Ek, Wk, Dk, ratio, |
|  |  |  | ;−(1−r2)/2, (−r2)/2 |
|  | move | #2, m3 | ;three data |
|  | move | #1, m5 |  |
|  | move | #5, m7 |  |
|  | move | #2, n7 |  |
|  | move | #1, n5 |  |
|  | move | #0, y1 | ;initialization for Wk |
|  | move | #ratio, x0 |  |
|  | move | #bbb, y0 |  |
|  | move | #ccc, x1 |  |
|  | move | y1,y:(r7)+ |  |
|  | move | (r7)+ |  |
|  | move | x0,y:(r7)+ |  |
|  | move | y0,y:(r7)+ |  |
|  | move | x1,y:(r7)+ |  |
|  | move | (r7)+ |  |
|  | andi | #$fc, mr | ;enable ssi interrupt |
| loop | jmp | loop | ;wait for interrupt |

Main routine (Interrupt Service Routine)

|  |  |  |  |
|---|---|---|---|
| Rx_ssi | movep | x:input, a |  |
|  | move | a1,x:(r3)+ | ;save Xk to mem and point |
|  | move | x:(r3)+, x1 y:(r7)+n7, y1 | ;Get Xk−1 to X1, point Xk−2 |
|  |  |  | ;move Wk/2 into y1, |
|  |  |  | ;point Ratio |
|  | mpy | x1, y1, a | ;A = (Wk/2)*Xk−1 |
|  | move | a,x0 | ;X0=(Wk/2)*Xk−1 |
|  | move | y:(r7)+, y0 | ;move Ratio into y0, |
|  |  |  | ;point −(1−r**w)/2 |
|  | mpy | x0, y0, a y:(r5)+, x0 | ;make Ratio*Wk/2*Xk−1, |
|  |  |  | ;x0=X'k−1, point X'k−2 |
|  | move | y:(r5), y0 | ;move X'k−2 into y0 |
|  | mac | x0,y1,a x:(r3)*, x0 y:(r7)+, y1 | ;mac Xik−1*Wk/2 & |
|  |  |  | ;Ratio*Xk−1*Wk/2, move |
|  |  |  | ;Xk−2 to x0, point Xk |
|  |  |  | ;make Y1=−(1−r**2)/2, |
|  | mac | x0,y1,a y:(r7)+,x0 | ;mac −.19*Xk−1, x0+−.81 and |
|  |  |  | ;point to Ek |
|  | move | (r7)+n7 | ;point to Dk |
|  | mac | x0,y0,a y:(r7)−n7, y0 | ;mac −(r**2)/2*X"k−2, |
|  |  |  | ;Dk=y0, point Ek |
|  | asl | a x:(r3)+, x0 | ;correct to make X"k, get |
|  |  |  | ;Xk, point Xk−1 |
|  | move | a,y:(r5)− | ;save X'k to memory, |
|  |  |  | ;overwriting |
|  | mpy | x1,y0,b | ;multiply Dk*Xk = Yk |
|  | sub | a,b | ;subtract Dk*Xk − X'k=Ek |
|  | move | b,y:(r7)+ | ;save Ek & point Wk |
|  | move | x:(r3)+, x1 | ;move Xk−1 into x1, point |
|  |  |  | ;Xk−2 for update |
|  | move | #ratio, y0 | ;Put (1−r**2)1(1+r*2) into y0 |
|  | mpy | x1,y0,a y:(r5)+, y0 | ;mpy #a02*Xk−1 to A, |
|  |  |  | ;move X'k−1 into y0 |
|  | add | y0,a #mu1,x1 | ;make Ak = #a02*Xk−1 + |
|  |  |  | ;X'k−1, make X1 = u1 |
|  | asr | a | ;divide Ak by two to |
|  |  |  | ;prevent overflow |
|  | and | #$bf,ccr | ;clear limit bit to check |
|  |  |  | ;overflow |
|  | move | a,y0 | ;move Ak into y0 |
|  | mpy | x1,y0,a b,x0 | ;multiply (Ak/2)*mu1, |
|  |  |  | ;x0=Ek |
|  | move | a,x1 | ;move Ak*mu1=x1 |
|  | mpy | x0,x1,a y:(r7)+, x0 | ;mac Ak*mu1*Ek, move |
|  |  |  | ;Wk/2 to x0, point dk |
|  | move | #$7fffff, y0 | ;y0=1 to make Dk=1 |
|  | add | x0,a y0,y:(r7)− | ;find Wk + and save 1 |
|  |  |  | ;to Dk+1, point Wk |
|  | and | #$bf, ccr | ;clear limit bit |
|  | move | a,y:(r7) | ;save Wk+1 and no pointer |
|  |  |  | ;change |
|  | move | (r3)+ | ;point to Xk |

Appendix I -continued

| | | |
|---|---|---|
| move | x:(r3)—,b y:(r5),y0 | ;move Xk into b and ;move X'k into y0 |
| move | y:dk, y1 | ;move Dk into y1 |
| mpy | y0,y1,a #mu2, x0 | ;multiply X'k*Dk, ;move mu2 into x0 |
| sub | a,b | |
| move | b,x1 | ;Xk—X'k*Dk |
| move | y:(r5), x1 | ;move Xk into x1 |
| mpy | x1,x0,a b,y:err2 | ;Xk*mu2, move error term ;into memory |
| move | a,x1 | |
| move | b,y1 | ;move error and Xk*mu2 ;into registers |
| mpy | x1,y1,a y:dk,y0 | ;Xk*mu2*err2 |
| add | y0,a | ;Dk+1 = Dk+Xk*mu2*err2 |
| move | a,y:dk | ;store Dk + 1 |
| movep | a,x:output | |
| rti | | |
| end | | |

We claim:

1. A method of dual-tone multifrequency detection, comprising the steps of:
   receiving an input signal having both a first and a second frequency component;
   decimating the input signal by a first predetermined integer ratio to provide a decimated signal;
   filtering the decimated signal with a half band finite impulse response filter to remove the first frequency component from the input signal to provide a second frequency component signal;
   subtracting the second frequency component signal from the decimated signal to provide a first frequency component signal;
   adaptively filtering the first frequency component signal to provide a first frequency parameter and a first gain factor derived from the first frequency component;
   decimating the second frequency component signal by a second predetermined integer ratio to provide a decimated second frequency component signal;
   adaptively filtering the decimated second frequency component signal to provide a second frequency parameter and a second gain factor derived from the decimated second frequency component signal; and
   comparing each of the first and second frequency parameters to a plurality of predetermined frequency parameters, and comparing each of the first and second gain factors to a first and a second predetermined threshold value to determine dual-tone validity.

2. The method of claim 1 wherein the first predetermined integer ratio is two to one.

3. The method of claim 1 wherein the second predetermined integer ratio is two to one.

4. The method of claim 1 further comprising the step of:
   sampling the dual-tone input signal at a sampling frequency of substantially eight kilohertz.

5. The method of claim 1 wherein the first frequency component is substantially between 1200 to 1700 Hertz and the second frequency component is substantially between 600 to 1000 Hertz.

6. The method of claim 1 further comprising the step of:
   storing the decimated signal while low pass filtering the decimated signal to delay the decimated signal prior to the subtracting.

7. The method of claim 1 wherein the steps of adaptively filtering further comprise filtering the decimated second frequency component signal at substantially one-half a rate of filtering of the first frequency component signal.

8. The method of claim 1 further comprising the step of:
   converting an audio analog signal to the input signal, the audio analog signal being converted to a digital form by a sigma-delta analog to digital converter to provide the input signal.

9. A dual-tone multifrequency detector circuit, comprising:
   a first frequency decimator having an input for receiving an input signal, the first frequency decimator decimating the input signal by a first predetermined integer ratio to provide a decimated signal;
   a half band finite impulse response low pass filter coupled to the first frequency decimator for receiving the decimated signal, the half band finite impulse response low pass filter filtering the decimated signal to remove a first frequency component from the input signal to provide a second frequency component signal;
   an adder having a first input coupled to the first frequency decimator for receiving the decimated signal and a second input coupled to the half band finite impulse response low pass filter for receiving the second frequency component signal, the adder subtracting the second frequency component signal from the decimated signal to provide a first frequency component signal;
   a first adaptive filter coupled to the adder for receiving the first frequency component signal, the first adaptive filter filtering the first frequency component signal to provide a first frequency parameter and a first gain factor derived from the first frequency component signal;
   a second frequency decimator coupled to the half band finite impulse response low pass filter for receiving the second frequency component signal, the second frequency decimator decimating the second frequency component signal by a second predetermined integer ratio to provide a decimated second frequency component signal;

a second adaptive filter coupled to the second frequency decimator for receiving the decimated second frequency component signal, the second adaptive filter filtering the decimated second frequency component signal to provide a second frequency parameter and a second gain factor derived from the decimated second frequency component signal; and a compare circuit coupled to the first adaptive filter for receiving both the first frequency parameter and the first gain factor and coupled to the second adaptive filter for receiving both the second frequency parameter and the second gain factor, the compare circuit comparing each of the first and second frequency parameters to a plurality of predetermined frequency parameters, and comparing each of the first and second gain factors to a first and a second predetermined threshold value to determine dual-tone validity.

10. The dual-tone multifrequency detection circuit of claim 9 further comprising:

a delay circuit coupled to the first frequency decimator for receiving the decimated input signal, the delay circuit temporarily storing the decimated input signal for a predetermined period of time to provide a delayed decimated input signal to the first input of the adder.

11. A method of dual-tone multifrequency detection, comprising the steps of:

receiving an input signal having both a first and a second frequency component; decimating the input signal by a first predetermined integer ratio to provide a decimated signal; filtering the decimated signal with a half band finite impulse response filter to remove the first frequency component from the input signal to provide a second frequency component signal; storing the decimated signal while low pass filtering the decimated signal to provide a delayed decimated signal;

subtracting the second frequency component signal from the delayed decimated signal to provide a first frequency component signal;

adaptively filtering the first frequency component signal to provide a first frequency parameter and a first gain factor derived from the first frequency component signal;

decimating the second frequency component signal by a second predetermined integer ratio to provide a decimated second frequency component signal;

adaptively filtering the decimated second frequency component signal at substantially one-half a rate of filtering of the first frequency component to provide a second frequency parameter and a second gain factor derived from the decimated second frequency component signal; and comparing each of the first and second frequency parameters to a plurality of predetermined frequency parameters, and comparing each of the first and second gain factors to a plurality of predetermined threshold values to determine dual-tone validity.

12. The method of claim 11 wherein the first predetermined integer ratio is two to one.

13. The method of claim 11 wherein the second predetermined integer ratio is two to one.

14. The method of claim 11 wherein the first frequency component is substantially between 1200 to 1700 Hertz and the second frequency component is substantially between 600 to 1000 Hertz.

15. The method of claim 14 wherein the step of low pass filtering further comprises halfband finite impulse response filtering.

16. The method of claim 11 wherein the plurality of predetermined threshold values is comprised of a first threshold value and a second threshold value, each of the first and second threshold values respectively corresponding to the first and second gain factors.

* * * * *